United States Patent

Hubbard

[15] 3,670,927

[45] June 20, 1972

[54] METHOD AND MEANS PROVIDING DOSAGES OF ORAL HYGIENIC SUBSTANCE

[72] Inventor: Alan M. Hubbard, 62 Hill Street, Morristown, N.J. 07960

[22] Filed: March 25, 1970

[21] Appl. No.: 22,557

[52] U.S. Cl. .............................222/107, 206/56 AA, 229/66
[51] Int. Cl. ...................................B65d 33/38, B65d 77/38
[58] Field of Search ................206/56 AA; 222/107; 229/66

[56] References Cited

UNITED STATES PATENTS

| | | |
|---|---|---|
| 2,248,266 | 7/1941 | Abrams..........................206/56 AA X |
| 1,978,217 | 10/1934 | Muckerjee...................206/56 AA UX |
| 3,278,085 | 10/1966 | Brown....................................222/107 |
| 2,983,087 | 5/1961 | Schofield...........................229/66 UX |

Primary Examiner—Leonard Summer
Attorney—Bernard J. Murphy

[57] ABSTRACT

Envelope of supple material, such as plastic, having a sealed chamber confines the substance. The chamber is formed with a narrowing portion, and the envelope has a cut in one side adjacent the narrowing portion to insure a tearing open of the envelope across the narrowing portion. Thus, a restricted pouring nozzle is provided. The envelope has a stiffener therewithin to make it handy to hold during pouring. Also, the stiffener cooperates with the cut to facilitate a tearing of the envelope across a predetermined line.

1 Claim, 5 Drawing Figures

PATENTED JUN 20 1972 3,670,927

INVENTOR
ALAN M. HUBBARD

BY
AGENT

METHOD AND MEANS PROVIDING DOSAGES OF ORAL HYGIENIC SUBSTANCE

The invention comprises the novel, substance-filled envelope, a magazine and housing for dispensing from a supply of such envelopes, and the method of supplying oral hygienic substance in dosage amounts.

This invention pertains to means providing oral hygienic substances, and to methods for supplying such substances, and in particular to means and methods for providing and supplying such substances in dosage amounts.

It is already known in the prior art to provide and supply oral hygienic substances in bulk. However, it is not known to provision and supply only dosage quantities of oral hygienic substances in "one-shot," throw-away packets. Neither does it appear to have been obvious to do so.

Oral hygienic substances have been marketed since the beginning of the century, and yet, until my teaching, and in spite of a long-felt need, throw-away, dosage packets of such substances have been provisioned.

An oral hygienic substance is a product which is used daily. Thus, it has been not too inconvenient for the product users to obtain dosage quantities from a bulk supply, to wit: a large bottle having a quart measure of substance in a liquid form, or a large box having a pound or two of non-liquid substance. However, the business man on a one or two-day trip most assuredly has no wish to carry a quart of oral hygienic substance in his luggage. Preferably, he would wish to carry no such substance in any supply quantity with him. What he has needed to find is throw-away packets of the substance, available to him in hotel room dispensers, in wash-room dispensers, or across the counter in drug stores and markets. The same need is known to whomever it is that travels — families on vacation trips, salesmen on the road, and so on. The bulk supply of oral hygienic substance, for use at *home*, may be acceptable, but individual user-dosage, throw-away packets would be preferred, and for use *away* from home constitute a pressing, unmet need.

Many oral hygienic substances are in liquid form. Now, it is well taught in the prior art to package or envelop small quantities of liquid substances. For instance, it is known to packet liquid hair shampoo. The shampoo packets are torn open and the contents disgorged from the opened packet chamber. This is attended with considerable spillage or drippage, as soon as the chamber is opened, however, it is of no consequence. All spilled or dripped quantities repose in the hair which is to be cleansed, or on the hands which will "work up" the shampoo in the hair.

Products enclosed in a pickling or brine in a sealed envelope are also known, and access to such products is also a disordered operation. Here too, when the product-envelope is opened, the brine gushes forth in unintended directions. The product-user, accordingly, will open such product-envelopes over a kitchen sink or over a bowl.

An oral hygienic substance, however, especially those of the liquid type, are to be handled in those ways which avoid wastage, spillage, and disordered evacuation from the container.

It is an object of this invention, then, to teach means and methods for providing and supplying oral hygienic substances in dosage amounts.

It is another object of this invention to teach such means and methods, as noted above, which provide and supply said dosage amounts in "one-shot," throw-away-type of packets.

It is another object of this invention to teach oral-hygienic-substance means comprising a sealed chamber in an envelope having means defining a restricted pouring nozzle more readily to control the evacuation of the substance from the chamber.

A feature of this invention comprises the provisioning of an envelope of supple material, such as plastic, having a sealed chamber therewithin in which is confined a dosage quantity of oral hygienic substance, the chamber having a narrowing portion with a cut adjacent thereto to insure a tearing open of the envelope therefrom and across the envelope through the narrowing portion.

Further objects and features of this invention will become more apparent by reference to the following description taken in conjunction with the accompanying figures, in which.

Figure 2:
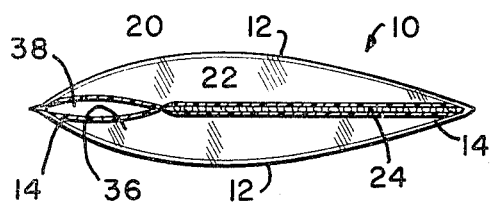
FIG. 2 is a cross-sectional view, taken along section 2—2 of FIG. 1, as the envelope of FIG. 1 would appear after having been torn open, showing the pouring nozzle and the remaining portion of the stiffener.
Figure 1:
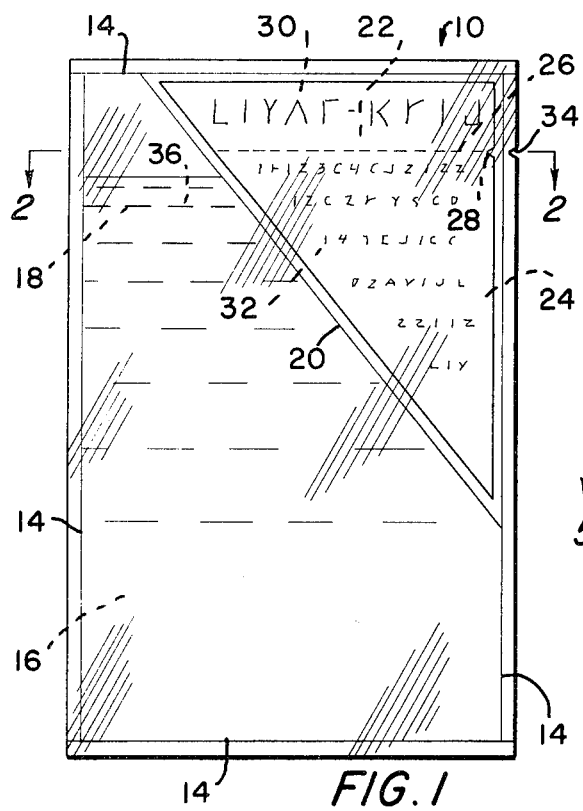
FIG. 1 is a side elevational view of an embodiment of the invention, the same depicting a transparent, plastic envelope with liquid, oral hygienic substance therein.

As shown in FIGS. 1 and 2, an envelope 10, formed of surmounting or juxtapositioned films or leaves 12 of supple, transparent plastic, are heat-sealed about the inter-faced edges thereof at 14, to define a first chamber 16 therewithin. This first chamber 16 confines a liquid, oral hygienic substance 18. The substance 18 constitutes a "dosage" portion, and is packaged for a user to pour the substance into a disposable cup or the like, for oral hygienic purposes.

The leaves 12 are further heat-sealed together at 20, to define a second chamber 22 therewithin and therebetween. In chamber 22 is disposed a stiffener 24, the same being pasteboard or the like. Stiffener 24 is perforated along line 26 to facilitate the tearing apart of the stiffener therealong. A notch 28 is formed in the outer lateral edge of the stiffener 24 to make the separation of the stiffener upper and lower portions 30 and 32 facile. Further, the envelope 10 has a small cut at 34, immediately adjacent to notch 28. Cut 34 and notch 28 cooperate to assure that the envelope 10 will tear along line 26, when the envelope is torn open from cut 34.

The angular heat-sealing 20 causes the chamber 16, the first chamber, to have a narrowing portion 36. Therefore, when the envelope 10 is torn open along line 26, the chamber 16 is opened; however, as portion 36 is of narrowing configuration, the opening of chamber 16 presents a restricted pouring nozzle 38 more readily to control the pouring of the substance 18 therefrom.

It is to be noted that the leaves 12 are transparent. For this provisioning, the stiffener 24 can be utilized to present supplier identification, advertising, and/or dosage instructions, the latter being subject to reading in that the leaves have transparency. More importantly, however, after the envelope 10 has been torn open, the lower portion 32 (besides having presented a bearing surface for the rupture of the envelope 10) remains in chamber 22 and provides a more rigid element for the handling of the envelope during the pouring of the substance from nozzle 38.

This handling provision, together with the restricted nozzle 38, make it possible to pour the substance 18 with care — with a minimum of spillage.

In accord with the teaching of my invention, the method of supplying oral hygienic substance in dosage amounts, comprises the provisioning of a chamber, such as that of chamber 16 and chamber 22 together. Then, my teaching is to narrow-off a portion of the provisioned chamber by heat-sealing leaves 12 together on an angle as at 20. Of course, to facilitate a filling of the chamber so-provisioned, one side thereof must be left open. After filling the chamber with the oral hygienic substance, the one side must then be sealed off. Finally, an edge of the juxtapositioned leaves 12 must be cut through, without rupturing the chamber, adjacent the narrowed-off portion of the chamber, to insure that when the chamber is torn open, it will be opened in the narrowed-off portion and present a restricted pouring nozzle.

It is considered preferable to provide stiffening material, such as stiffener 24, in the chamber 22 defined by heat-sealing 20, to render the pouring of the oral hygienic substance more facile. Further, I teach the notching of such stiffener, at 28, immediately adjacent the cut edge of the envelope which defines the chamber, and the perforation of the stiffener transverse to the narrowed-off portion of the chamber, to insure the opening of only the narrowed-off portion.

Figure 3:
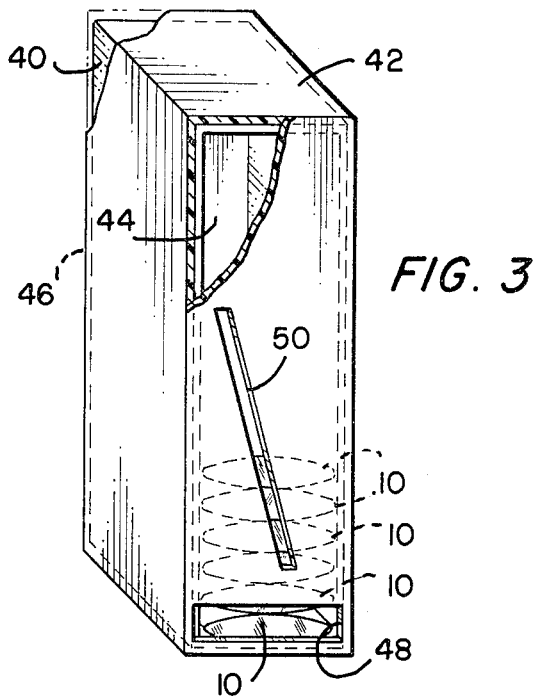
FIG. 3 is an isometric or perspective view of a magazine and an enveloping housing therefor, providing a dispenser means for a supply of the hygienic-substance-filled envelopes of FIG. 1.

In addition, my invention contemplates the use of a magazine 40, as shown in FIG. 3, and housing 42, to enable the dispensing of the enveloped dosages of oral hygienic substance.

Magazine 40 is a five-sided component, having an open side 44 from which envelopes 10 can be removed. The housing 42 is another five-sided component having inside dimensions which closely complement the outside dimensions of the magazine 40. Housing 42 has an open side 46 through which the magazine can be inserted. Further, housing 42 has an aperture 48 in a side thereof opposite side 46 from which successive envelopes 10 can be withdrawn. Finally, housing 42 has a window 50, here shown as a throughgoing aperture, through which the condition of the supply of envelopes 10 can be determined at sight.

The embodiment of the invention shown in FIGS. 1 and 2 teach the use of separate leaves 12 which are heat-sealed together about all four inter-faced sides. Of course, the teaching of my invention will suggest other embodiments to those skilled in the art to which my invention pertains. For instance, "one-shot," throw-away-type envelopes of oral hygienic substance can readily be fashioned from a single leaf of plastic. Such an alternate embodiment of the invention is shown in FIGS. 4 and 5.

Figure 5:
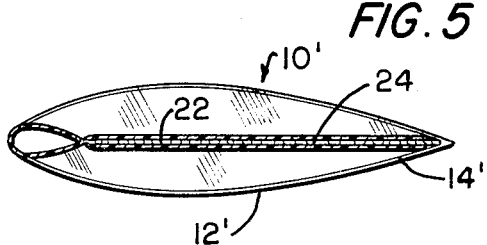
FIG. 5 is a cross-sectional view, taken along section 5—5 of FIG. 4, as the embodiment of FIG. 4 would appear after having been torn open.
Figure 4:
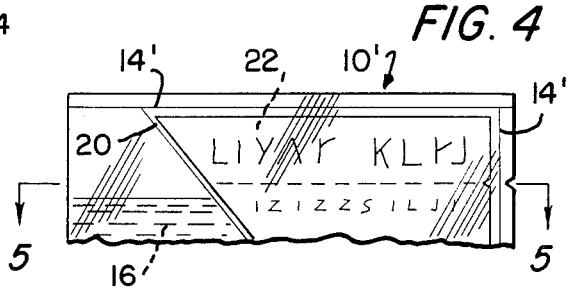
FIG. 4 is a side elevational view of a portion of an alternate embodiment of the invention.

Index numbers on FIGS. 4 and 5 which are the same as, or similar to index numbers presented in FIGS. 1 and 2, denote same or similar components or elements.

FIG. 4 illustrates a portion of an alternate embodiment of an envelope 10' of oral hygienic substance formed of a single leaf 12' of supple, transparent plastic. Leaf 12' is folded over and heat-sealed together at the three inter-faced edges thereof at 14', to define a first chamber 16 therewithin. Envelope 10' further has the heat-sealing at 20 to define the second chamber 22 therewithin and therebetween.

My invention contemplates envelopes 10 or 10' confining "-dosage" quantities of oral hygienic substance. Therefore, the envelopes can be torn open, and the substance used directly therefrom — or poured into a cup or glass — and then be thrown away. The dosages comprised by my teaching will embrace not less than a half ounce of liquid oral hygienic substance, for use by children, through dosages of 1½ ounce or 2 ounces of liquid substance, for use by adults, to ten ounces of liquid substance, for use as a "family-size" envelope.

For non-liquid oral hygienic substances, my invention contemplates dosage envelopes 10 and 10' of quantities thereof complementary to the liquid dosages just noted.

While I have described my invention in connection with specific embodiments thereof, and specific methods of its practice, it is to be clearly understood that this is done only by way of example and not as a limitation to the scope of my invention as set forth in the objects thereof and in the appended claims.

I claim:

1. Means providing a dosage of oral hygienic substance, comprising:

a pair of leaves of supple, light-transmissive material, said leaves being superimposed, one upon the other thereof, and being sealed together by means of a first, continuous seal fully about the periphery of said leaves to define an envelope;

said leaves being further sealed together by a second seal which, cooperative with said first seal, forms two separate chambers within said envelope, and defines each of said chambers with a first, narrowed-off portion and a second, widened portion; wherein said first, narrowed-off portion of one of said chambers is juxtaposed with said second, widened portion of the other of said chambers, and vice versa;

a dosage of oral hygienic substance confined within one of said chambers; and a substantially triangular-shaped stiffener confined within the other of said chambers, said stiffener occupying substantially all of said other chamber;

said leaves having a common cut formed in edges thereof adjacent to both said first seal and said second, widened portion of said other, stiffener-confining chamber;

said stiffener having a linearly disposed line of perforations formed therein, one end of said line being in immediate, aligned adjacency to said common cut;

said cut and said perforations being cooperative to facilitate a tearing open of said envelope, and a resultant opening of said first and second portions, respectively, of said one and other chambers;

said stiffener, cooperative with said first and second portions of said other chamber, providing for an efficient handling of said envelope during a pouring of said substance from said one chamber via said first portion of said one chamber; and wherein said first portion of said one chamber, on being torn open, defines a restricted pouring nozzle more readily to control evacuation of said substance.

* * * * *